United States Patent [19]

Nolting et al.

[11] Patent Number: 4,515,175

[45] Date of Patent: May 7, 1985

[54] CONTROL IMPULSE INTENSIFIER

[75] Inventors: Rolf Nolting; Bernhard Siniza, both of Bad Freienwalde, German Democratic Rep.

[73] Assignee: VEB Ingenieurbuero fuer Meliorationen, Bad Freienwalde, German Democratic Rep.

[21] Appl. No.: 359,537

[22] Filed: Mar. 18, 1982

[30] Foreign Application Priority Data

Apr. 9, 1981 [DD] German Democratic Rep. .................................... 2291107

[51] Int. Cl.³ ............................................. F16K 11/00
[52] U.S. Cl. ................... 137/107; 137/512.4; 137/853
[58] Field of Search ............. 137/102, 107, 853, 512.4

[56] References Cited

U.S. PATENT DOCUMENTS 2,941,541 6/1960 Peras .................................. 137/102
3,631,877 1/1972 Barosko ............................. 137/102

Primary Examiner—Robert G. Nilson
Attorney, Agent, or Firm—Jordan and Hamburg

[57] ABSTRACT

A control impulse intensifier for an impulse fluid flow system adapted to be situated between a supply line and a pipe line comprises a housing situated between the supply line and the pipe line and having an outflow passage therein, a hollow valve element situated inside the housing to define an inner valve space inside the valve element communicating with both the outflow passage and the pipe line and an outer valve space between the housing and the valve element, a flexible cylindrical device situated at least inside the hollow valve element, and a valve core situated inside the flexible cylindrical device and having at least one path outside the valve core. The hollow valve element is provided with a sealing flange outside thereof so that the outer valve space is divided into a supply side communicating with the supply line and a pipe side communicating with the pipe line, at least one first boring passing through the valve element at the supply side, and at least one second boring passing through the valve element at the pipe side. The second boring includes a device to prevent fluid from passing therethrough from the outer valve space of the pipe side.

4 Claims, 2 Drawing Figures

U.S. Patent   May 7, 1985   4,515,175
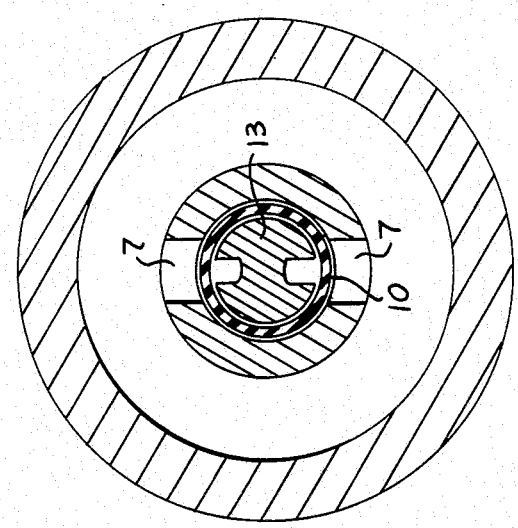
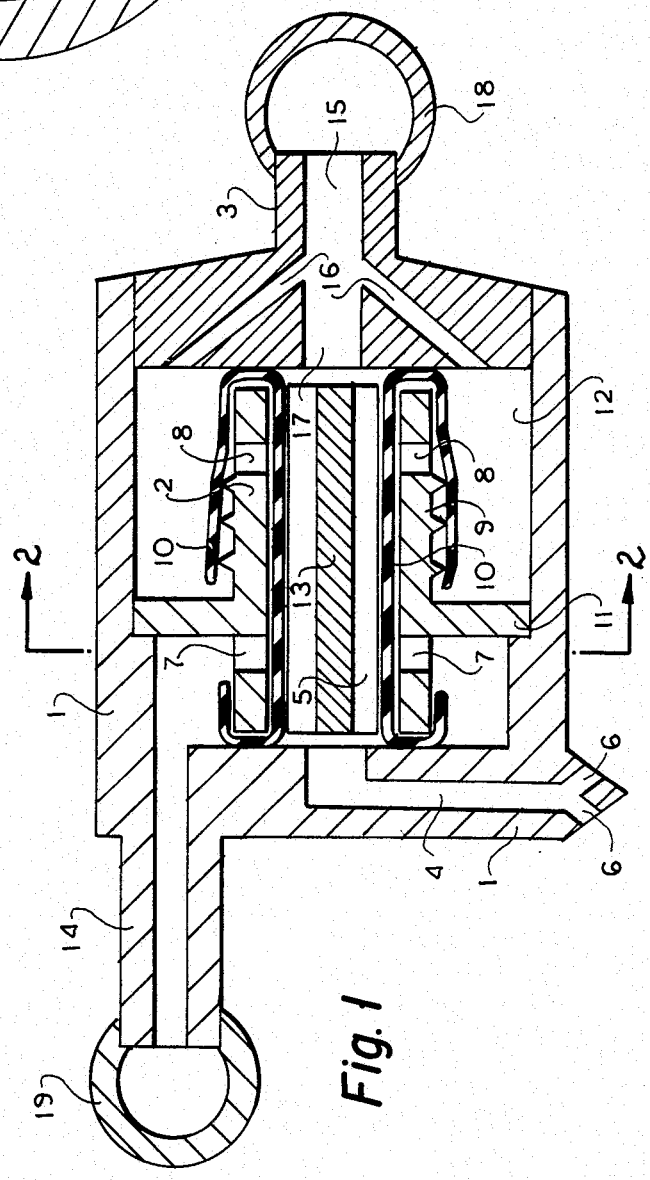

CONTROL IMPULSE INTENSIFIER

BACKGROUND OF THE INVENTION AND PRIOR ART STATEMENT

This invention relates to a control impulse intensifier for impulse-surging-watering systems, preferably for agricultural watering systems, in which pressure impulses are generated from a central control system that release cutoff actions on the water-output elements of the watering system. The control impulse intensifiers can also be employed for other liquids as well as gases.

SU No. 264 986 (Soviet Inventor's Certificate No. 264 986) has made available for a technical solution that increases the range of action of hydraulic control signals. The system for the transfer of hydraulic impulses operates according to the principle of a valve pair, the sides of which are alternately activated, thereby producing pressure-increase impulses or pressure-decrease impulses. These hydro-activated fixing elements are activated over a gate distributor which receives the control impulses hydraulically transmitted over the pipe line, re-transmitting them to correspond with the valves. One disadvantage of this system is the costly, complicated construction that comprises a few mechanically acting elements, such as, for instance, fixing elements, such as siphons etc. which are expected to be subject to high wear and tear, thereby affecting operational safety and life expectancy of the system. Another disadvantage is that the system will operate only at a predetermined, set pressure.

Further, according to SU Inventor's Certificate No. 541 465, an invention has been known that improves upon the aforementioned solution. The concept of the invention is using two water-air storage means which are controlled over a hydro distributor that is formed as a three-way valve. The hydro distributor herein connects the pressure-releasing pipe line with the atmosphere. One disadvantage of this arrangement is the costly use of fittings in the hydro distributor and the arrangement of water-air storages.

The object of the invention is preventing costly technical constructions and reducing wear and tear of the material.

The invention has the object of creating a wear-resistant control-impulse intensifier with high operating effectiveness that reacts at any desired pressure change and, at the same time, fulfills the function of a water-output element.

SUMMARY OF THE INVENTION

In accordance with the present invention, this object is accomplished in that a control impulse intensifier is arranged between a supply line and a pipe line coupled at the outlet side which comprises a housing that is locked onto an interconnector coupled at the outlet side. The housing comprises a pipe connection for the supply line and the boring with the outlet opening. The intensifier comprises a tube-shaped valve element which is provided with valve ribs as well as a disc-shaped sealing surface on its outer surface. The valve element further comprises radial borings as inlet and outlet openings. The valve element comprises a middle valve carrier compartment which is provided with a hose and a valve core. The interconnector locking the housing comprises borings which connect the pipe line coupled at the outlet side with the middle valve carrier compartment and with the hollow compartment between outer portion of the valve element having the valve ribs and inside portion of the housing wall. Very conveniently, the outer circumference of the valve element is also totally or partially covered by the hose. The circumference of the valve core corresponds to the inner surface of the hose and partly deviates inwardly along the longitudinal direction thereof.

BRIEF DESCRIPTION OF THE DRAWING

FIG. 1 is a sectional view of the control impulse intensifier.

FIG. 2 is a sectional view taken along line 2—2 in FIG. 1

DETAILED DESCRIPTION OF A PREFERRED EMBODIMENT

The control impulse intensifier comprises a housing 1 in which a valve element 2 has been assembled. The housing 1 is coupled with an interconnector 3. The housing further comprises a boring 4 which establishes a connection between a middle valve-carrier compartment 5 and an outlet openings 6. The valve element 2 is provided with a boring 7 and a boring 8. The valve element 2 includes valve ribs 9 in the section of a hollow compartment 12. The valve element 2 further comprises a hose 10 which, on one end, abuts against the housing 1 for sealing action over the valve element 2 and, at the other end, is located above the valve ribs 9. A valve core 13 is situated inside the hose 10, whose circumference corresponds to the inner surface of the hose 10, and partly dents inwardly along the longitudinal direction thereof. The valve element 2 has a disc-shaped sealing surface 11 against the housing 1. The interconnector 3 comprises borings which connect a pipe line 18 coupled at the outlet side with the middle valve carrier compartment 5, and also connect the hollow compartment 12 and the pipe line 18 coupled at the outlet side.

When the control impulse intensifier is charged with pressure by a supply line 19, then, through a pipe connection 14 arranged in the housing 1, the flow passes through the boring 7, a path between the hose 10 and the valve element 2, the boring 8, a path between the hose 10 and the valve ribs 9, and through the hollow compartment 12 and borings 16 and 15 towards the pipe line 18 coupled at the outlet side. Herein the hose 10 presses against the valve core 13 in the area of the middle valve carrier compartment 5 so that the flow path from the boring 15 through the boring 17 towards the boring 4, i.e., the dent on the valve core 13, is interrupted. If a depressurization occurs from the direction of the supply line 19, then a back-flow of the medium in the direction of the supply line 19 will not be possible since the hose 10 acts as a nonreturn check valve upon the valve ribs 9, and the connection to the boring 8 is interrupted. At the same time, however, the hose 10 in the area of the middle valve carrier compartment 5 is charged with pressure coming from the pipe line 18 coupled at the outlet side over the borings 15 and 17, releasing the hose 10 from the valve core 13, thereby passing the cross-sectional flow path to boring 4 as well as the outlet opening 6 to the atmosphere, the outflowing medium causing a depressurization of the pipe line 18 coupled at the outlet side.

The control impulse intensifier reacts simultaneously to pressure changes in the supply line 19 in view of the direct action of the hose 10 upon the flow-through cross-section in the valve carrier compartment 5. The stretch-free adjustment of the hose 10 to the valve core 13 minimizes the wear-and-tear on the material of the control impulse intensifier, ensuring safe operation to a high degree. The control impulse intensifier assumes, at the same time, the role of a water-output element, thus using the water exiting through the outlet opening 6 from the pipe line 18 coupled at the outlet side in view of de-pressurization, targetted for watering.

We claim:

1. A control impulse intensifier for an impulse fluid flow system adapted to be situated between a supply line and a pipe line, comprising
   a housing situated between the supply line and the pipe line, said housing having an outflow passage therein,
   a hollow valve element situated inside the housing to define an inner valve space inside the valve element communicating with both the outflow passage and the pipe line and an outer valve space between the housing and the valve element, said hollow valve element including a sealing flange outside thereof so that the outer valve space is divided into a supply side communicating with the supply line and a pipe side communicating with the pipe line, at least one first boring passing through the valve element at the supply side, and at least one second boring passing through the valve element at the pipe side, said second boring having means to prevent fluid from passing therethrough from the outer valve space of the pipe side,
   flexible cylindrical means situated at least inside the hollow valve element to be located beneath the first and second borings, and
   a valve core situated inside the flexible cylindrical means in the hollow valve element, said valve core having at least one path outside the valve core so that when fluid pressure of the supply line is higher than that of the pipe line, fluid in the supply line flows to the pipe line by passing through the first boring and then through a space between the hollow valve element and the flexible cylindrical means and extending from the first boring to the second boring and finally through the second boring to thereby block the path outside the valve core by means of the flexible cylindrical means being inflated inwardly by the fluid, and when fluid pressure of the supply line is lower than that of the pipe line, fluid in the pipe line passes through the path outside the valve core and exits from the outflow passage.

2. A control impulse intensifier according to claim 1, in which said flexible cylindrical means is a flexible hose, one end of the hose being folded at one end of the hollow valve element so that the end of the hose is located on the outer surface of the valve element in the supply side of the outer valve space, and the other end of the hose being folded at the other end of the hollow valve element so that the other end of the hose is located on the outer surface of the valve element in the pipe side of the outer valve space, the second boring being located under the folded hose so that the folded hose on the second boring constitutes the means to prevent fluid from passing through the second boring from the outer valve space at the pipe side.

3. A control impulse intensifier according to claim 2, in which said hollow valve element further includes at least one rib provided on the outer surface thereof between the sealing flange and the second boring, the folded hose being situated above the rib so that when fluid pressure of the supply line is lower than that of the pipe line, the folded hose is securely engaged with the rib by fluid in the pipe side of the outer valve space to prevent fluid from the pipe line from entering into the second boring.

4. A control impulse intensifier according to claim 3, further comprising an interconnector connected to the housing, said interconnector having a first passage in fluid communication between the pipe line and the inner valve space, and a second passage in fluid communication between the pipe line and the outer valve space at the pipe side.

* * * * *